United States Patent [19]

McAnally et al.

[11] Patent Number: 5,777,848
[45] Date of Patent: Jul. 7, 1998

[54] POWER SUPPLY MOUNTING ASSEMBLY FOR ELECTRONIC EQUIPMENT

[75] Inventors: Andrew McAnally; Stephen Cook, both of Georgetown, Tex.

[73] Assignee: Dell Computer Corporation, Round Rock, Tex.

[21] Appl. No.: 771,012

[22] Filed: Dec. 20, 1996

[51] Int. Cl.⁶ .................................. G06F 1/16; H05K 7/16
[52] U.S. Cl. ........................ 361/725; 361/610; 361/683; 312/223.2
[58] Field of Search .......................... 361/683, 686, 361/724–727, 796, 610; 312/223.2, 327, 328; 248/222.3, 304.1, 305, 674, 675

[56] References Cited

U.S. PATENT DOCUMENTS

| | | | |
|---|---|---|---|
| 3,679,829 | 7/1972 | Hofmeister et al. | 348/839 |
| 4,268,100 | 5/1981 | Kekas et al. | 361/725 |
| 4,972,296 | 11/1990 | Chu | 361/725 |
| 4,977,532 | 12/1990 | Borkowicz et al. | 364/708.1 |
| 5,032,952 | 7/1991 | Cooke et al. | 361/747 |
| 5,136,468 | 8/1992 | Wong et al. | 361/725 |
| 5,172,305 | 12/1992 | DeWilde | 361/725 |
| 5,694,291 | 12/1997 | Feightner | 361/683 |

*Primary Examiner*—Lynn D. Feild
*Attorney, Agent, or Firm*—Haynes and Boone, L.L.P.

[57] ABSTRACT

A mounting assembly for mounting a component in electronic equipment, such as a computer system, which includes an enclosure and a mounting bracket pivotally mounted to the enclosure. One or more retaining members are disposed on the bracket for engaging the component to retain the component in the bracket in abutting relationship. The bracket, and therefore the component, are connected to the enclosure so that they can be pivoted between a position in which the component is mounted in the enclosure and a position in which it extends out of the enclosure. In the mounted position, the bracket forms a portion of one or more walls of the enclosure.

21 Claims, 3 Drawing Sheets

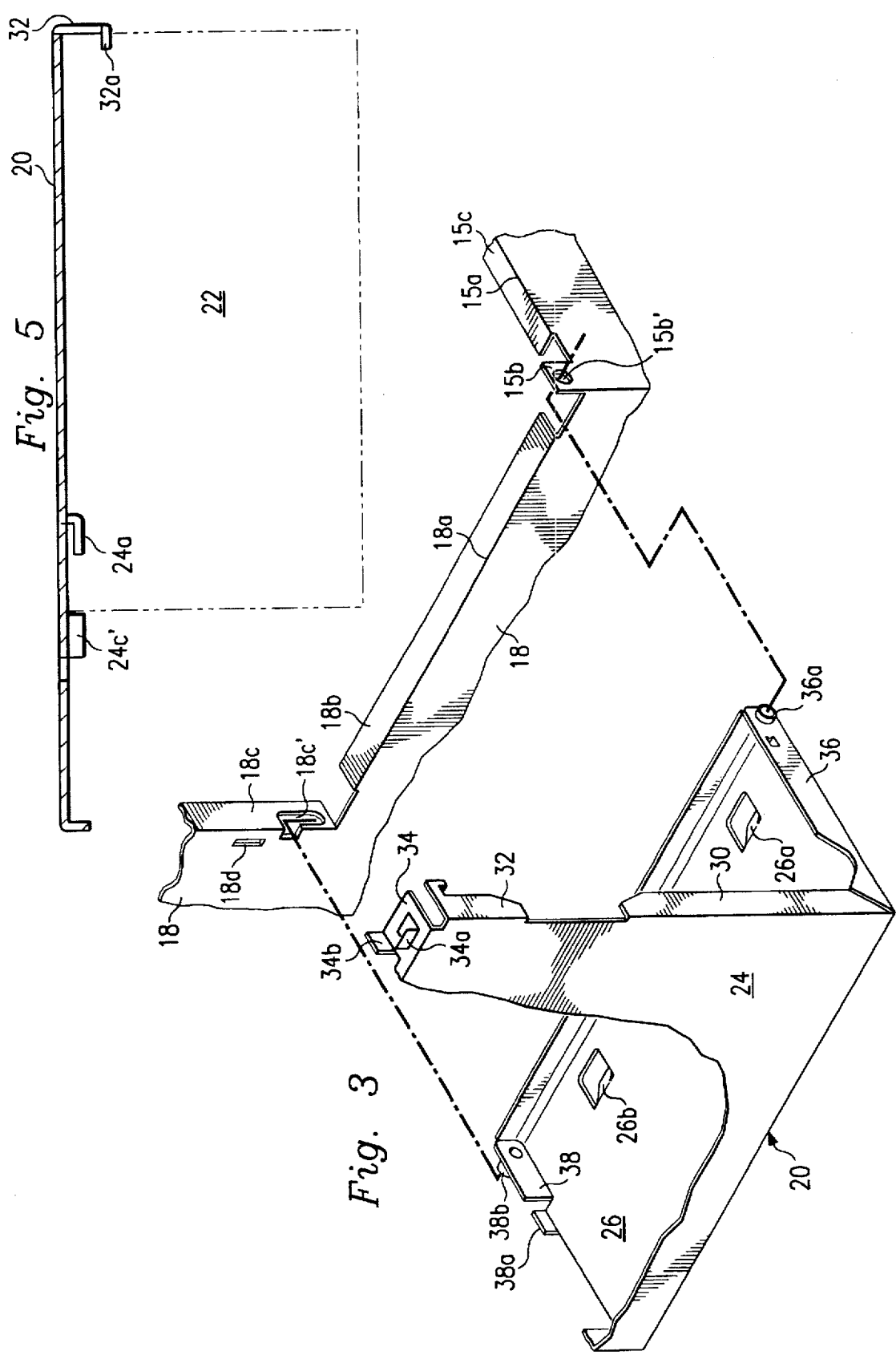

5,777,848

1

POWER SUPPLY MOUNTING ASSEMBLY FOR ELECTRONIC EQUIPMENT

TECHNICAL FIELD

The invention relates generally to the field of electronic equipment, such as computer systems, and the like and, more particularly, to an assembly for mounting a power supply in the equipment.

BACKGROUND

Many types of electronic equipment, such as computer systems, include power supplies which receive alternating current electrical power and convert the alternating current to direct current for operating the various electrical components contained within an enclosure. Power supplies for most computers are mounted directly onto the enclosure using screws, making it difficult to replace or remove the power supply for repair. Moreover, these types of mounting techniques usually do not allow for placement of user accessible or serviceable components below the power supply—a distinct disadvantage with respect to computers and other equipment in which interior space is at a premium.

Therefore, what is needed is a mounting assembly for a power supply for electronic equipment which takes up minimal space and enables the power supply to be easily and quickly mounted in, and removed from, the enclosure while allowing for placement of user accessible or serviceable components below the power supply.

SUMMARY

Accordingly, a mounting assembly mounts a power supply in an electronic component, such as a computer system, which includes an enclosure and a mounting bracket pivotally mounted to the enclosure. The mounting bracket includes two sections extending in a perpendicular relationship for respectively engaging corresponding faces of the power supply. One or more retaining members are disposed on the bracket for engaging the power supply to retain the power supply in the bracket in abutting relationship. The bracket, and therefore the power supply, are mounted in the enclosure in a manner so that they can be pivoted between a mounted position and a position in which the power supply extends out of the enclosure.

Advantages are thus achieved with the bracket since the power supply can be easily and quickly installed, serviced and replaced.

Another advantage of the assembly is that the power supply can be mounted in the enclosure above the bottom wall of the enclosure to permit user accessible or serviceable components to be mounted below the power supply.

BRIEF DESCRIPTION OF THE DRAWINGS

FIG. 3 is an enlarged, partial, exploded, perspective view of the mounting assembly of FIGS. 1–4.

FIG. 5 is an enlarged sectional view taken along the line 5—5 of FIG. 1, with the power supply being shown in phantom lines.

2

DETAILED DESCRIPTION OF THE PREFERRED EMBODIMENT

Figure 1:
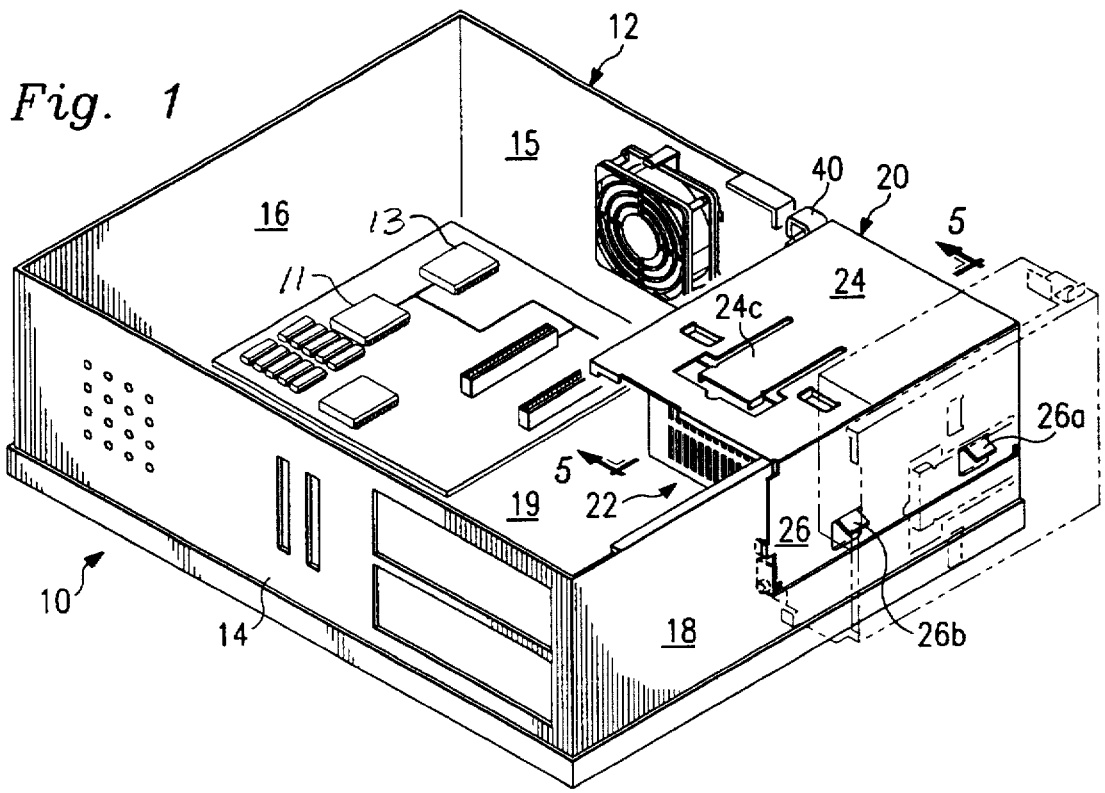
FIG. 1 is a perspective view of an equipment enclosure with the cover being removed to show the power supply mounting assembly.

Referring to FIG. 1 of the drawing, the reference numeral 10 refers, in general, to an electronic component, in the form of a desktop computer system, having a chassis, or inner enclosure, 12 formed by a front face, or plate 14, a rear wall 15, two sidewalls 16 and 18, and a bottom wall, or floor, 19. Although not shown for the convenience of presentation, it is understood that an outer enclosure extends over the enclosure 12 and includes a cover. The inner enclosure 12 is fabricated from metal and the outer enclosure from plastic. Also included in the computer system 10 are a microprocessor 11 mounted in the inner enclosure 12, and a memory module 13 operably connected to the microprocessor.

Portions of the rear wall 15 and the sidewall 18 of the inner enclosure 12 are cut out in a manner to be described to receive a mounting bracket, shown in general by the reference numeral 20. A power supply, 22, of a conventional design, is attached to the bracket 20, also in a manner to be described. For the convenience of presentation, several other components and parts of the computer system 10 are not shown and/or will not be described.

The mounting bracket 20 is in the form of an L-shaped plate folded, or bent to form two integral sections 24 and 26 extending at rights angles to each other. The section 24 extends horizontally and the section 26 extends vertically in the normal, "mounted" position of FIG. 1. As better shown in FIG. 2, a pair of locking hooks 24a and 24b are provided on the bracket section 24 and are preferably formed by removing a portion of the section to form the hooks and then bending the hooks downwardly as viewed in FIG. 2. A snap tab 24c is also provided on the bracket section 24 and is also preferably formed by removing a portion of the section and bending the opposed leading end edge portions 24c' and 24c" of the tab downwardly for reasons to be described.

A pair of flanges 30 and 32 are formed on the rear end of the bracket section 24, preferably by bending the end portion of the latter bracket section at right angles to the remaining portion of the section. An inwardly-directed tab 32a, having a curved cross-section, extends from the flange 32 for engaging the power supply 22.

A flange 34 is formed along the side edge of the bracket sections 24, preferably by bending the corresponding marginal portion of the latter bracket section at right angles to the remaining portion of the section. An outwardly extending horizontal tab 34a and an outwardly extending vertical tab 34b extend from the flange 34 and are adapted to engage in corresponding slots (not shown in FIG. 2) defined on the rear plate 15, as will be described.

A flange 36 is formed on the rear end of the bracket section 26, preferably by bending the end portion of the latter bracket section at right angles to the remaining portion of the section. An outwardly extending cylindrical extrusion 36a is also formed on the flange 36 and an inwardly-directed tab 36b, having a curved cross-section, extends from the flange 36 for engaging the power supply 22.

As shown in FIG. 3, a flange 38 is formed on the front end of the bracket section 26 opposite the flange 36. The flange 38 is preferably formed by bending the end portion of the latter bracket section at right angles to the remaining portion of the section. An outwardly-directed hook 38a is formed on the flange 38 preferably by removing a portion of the section to form the hook and then bending the hook out of the plane of the flange and the hook 38a is adapted to engage a corresponding slot 18d formed on the sidewall 18. An outwardly extending cylindrical extrusion 38b is also formed on the flange 38 which is identical to the extrusion 36a on the flange 36.

As also shown in FIG. 3, the sidewall 18 has a cut-out portion 18a having dimensions substantially corresponding to the corresponding dimensions of the plate section 26. A horizontal ledge 18b is formed by bending the upper portion of the sidewall 18 adjacent the cut-out portion 18a. A vertically extending flange 18c is provided on the sidewall 18 adjacent the cut-out portion 18a and is provided with an L-shaped slot 18c'. A slot 18d is provided in the sidewall 18 adjacent the cut-out portion 18a for receiving the hook 38a of the mounting bracket 20 in the mounted position of the bracket, as will be described.

The rear wall has a cut-out portion 15a and a flange 15b is provided on the rear wall 15 adjacent the latter cut-out portion with the flange being provided with a cylindrical opening. A horizontal ledge 15c is formed by bending the lower portion of the rear wall 15 adjacent the cut-out portion 15a.

Figure 2:
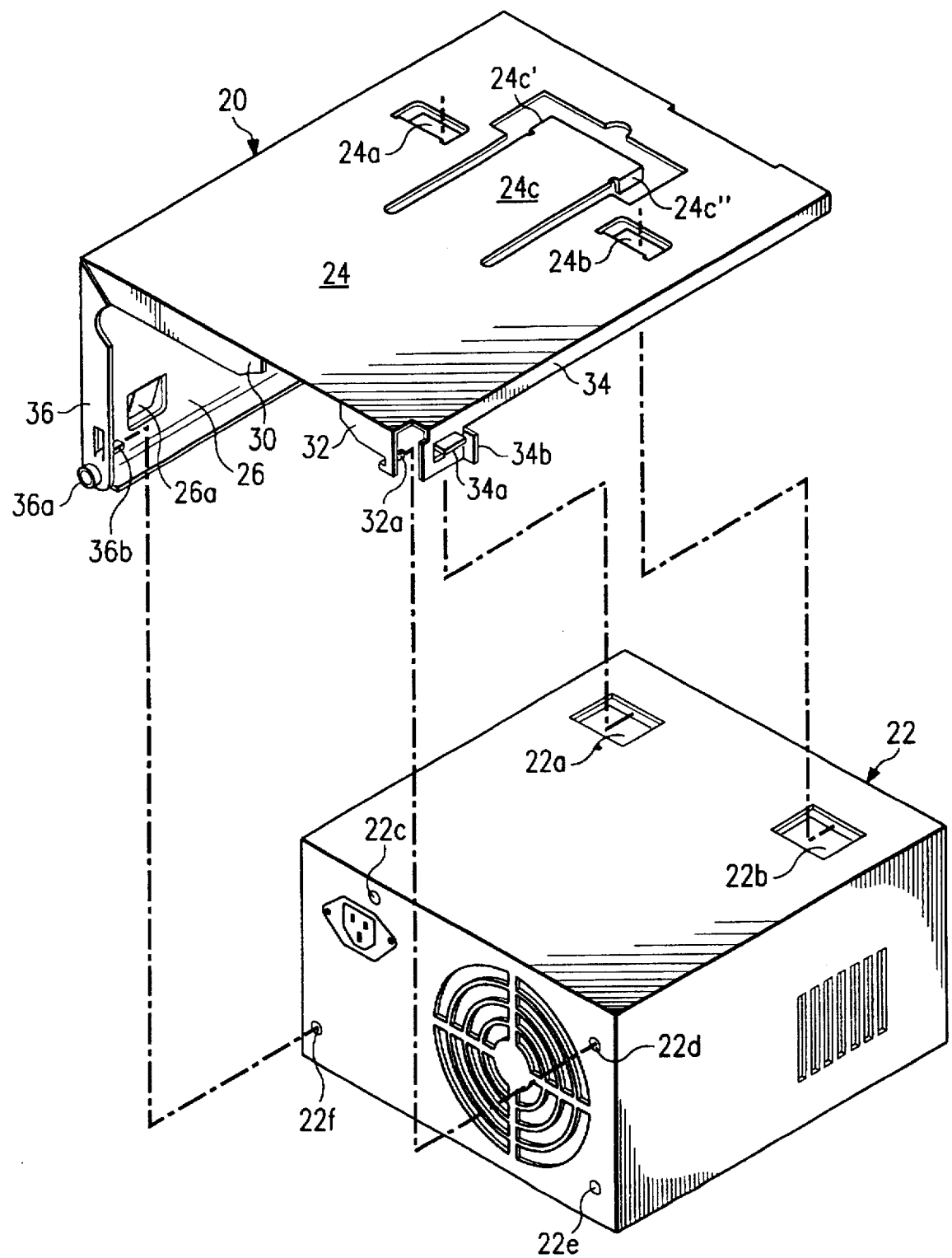
FIG. 2 is an enlarged, exploded, perspective view of the power supply and the mounting bracket of the assembly of FIG. 1.

The cylindrical opening 15b' in the flange 15b and the L-shaped slot 18c' in the flange 18c are sized to receive the extrusions 36a and 38b, respectively. The bracket 20 is thus connected to the sidewall 18 by initially inserting the extrusion 36a in the circular opening 15b' in the flange 15b and then inserting the extrusion 38b in the L-shaped slot 18c' in the flange 18c. This enables the mounting bracket 20 to be pivoted from its normal position shown in FIG. 1 in which it mounts the power supply in the enclosure 12, to the position shown by the phantom lines in FIG. 1 (and by the solid lines in FIG. 3) in which the power supply 22 extends outside the enclosure. As shown in FIGS. 1–3, a pair of stop tabs 26a and 26b are provided on the bracket section 26 and are preferably formed by removing a portion of the section to form the tabs and then bending the tabs outwardly as shown in FIGS. 1–3. The tabs 26a and 26b engage the outer surface of the sidewall 18 when the mounting bracket is in its extended position as discussed above.

Various other slots and openings are provided on the power supply 22 and the enclosure 12 for receiving the above-mentioned hooks and tabs on the mounting bracket 20. More particularly, as shown in FIG. 2, the power supply 22 is of a conventional design and, as such has a pair of slots 22a and 22b in its top face, as well as four mounting holes 22c–22e in its back face which are internally threaded to normally receive threaded mounting screws. The hooks 24a and 24b are designed to extend in the slots 22a and 22b, respectively, and the tabs 32a and 36b are designed to extend in the holes 22d and 22f, respectively, thus eliminating the need for threaded mounting screws.

Figure 4:
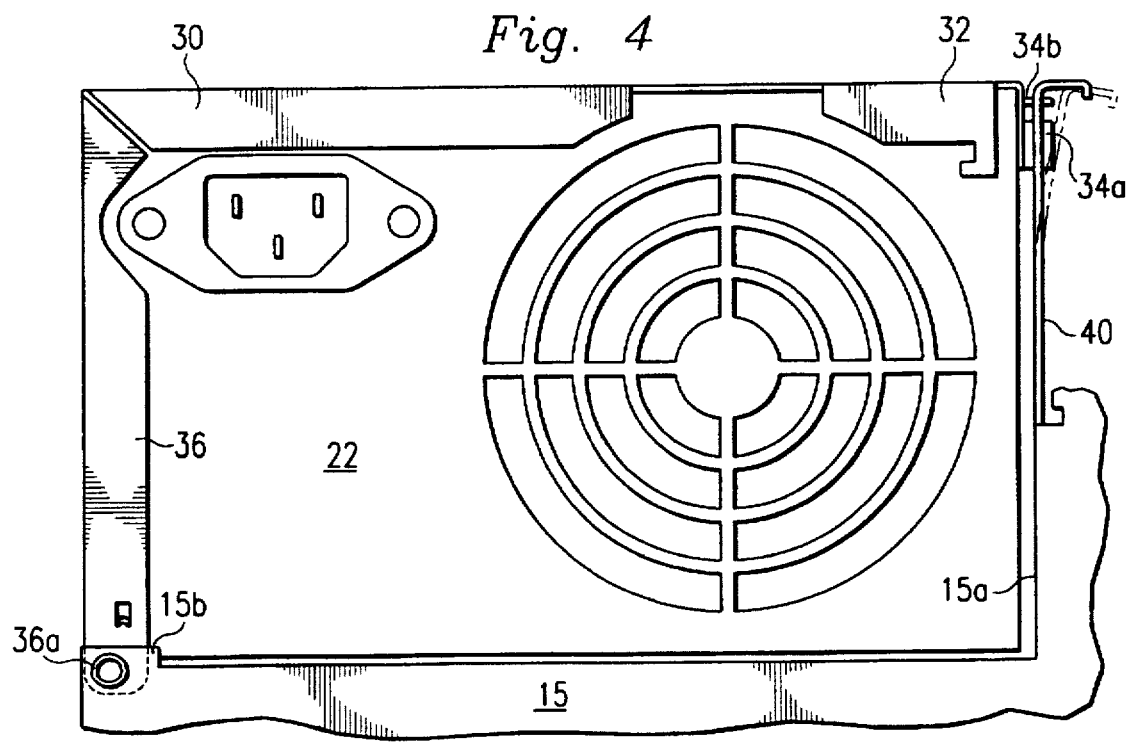
FIG. 4 is an enlarged, rear-elevational view of the mounting assembly and the power supply of FIGS. 1–3.

FIGS. 1, 4 and 5 depict the bracket 20 mounting the power supply 22 in the enclosure 12. With reference to FIG. 4, the flanges 30, 32 and 36 extend over and engage the back face of the power supply 22, and the tabs 32a and 36b extend in the holes 22d and 22f, respectively in the back face. A spring lever 40 (FIG. 4) is provided on the rear wall 15 of the enclosure 12 which has two openings extending therethrough which respectively receive the tabs 34a and 34b of the flange 34. FIG. 5 depicts the hook 24a extending in the slot 22a in the top face of the power supply 22, the edge portion 24c' extending over the front face of the power supply, and the tab 32a extending in the opening 22d in the back face of the power supply. Although not shown in FIG. 5, it is understood that the hook 24b extends in the slot 22b, the edge portion 24c" also extends over the front face of the power supply, and the tab 36b extends in the opening 22f. As shown in FIG. 1, in this mounted position, the power supply 22 extends above the floor 19 of the enclosure 12.

To mount the power supply 22 in the enclosure 12, the mounting bracket 20 is removed from its engagement with the sidewall 18 of the enclosure and positioned above the power supply as shown in FIG. 2. The hooks 22a and 22b are then inserted in the slots 24a and 24b, respectively, of the power supply 22, and the bracket 20 is advanced in a direction towards the front face of to the power supply, as viewed in FIG. 2, until the the flanges 30, 32, and 36 engage the back face of the power supply, as viewed in FIG. 4, and the tabs 32a and 36b thus extend in the openings 22d and 22f, respectively. In this position, the bent edge portions 24c' and 24 c" snap over the front face of the power supply 22 as shown in FIG. 5. With the power supply 22 thus secured in the mounting bracket 20, the bracket is then pivotally connected to the enclosure by inserting the extrusions 36a and 38b in the opening 15b' and the slot 18c' in the flanges 15b and 18c, respectively. The bracket 20, with the power supply secured thereto, is then rotated from the position shown in FIG. 3 and the position shown by the phantom lines in FIG. 1, to the position shown in FIG. 4 and by the solid lines in FIG. 1. In this position, the hook 38a extends in the slot 18d in the sidewall 18.

The power supply 22 is thus supported and secured in the enclosure 12 with a space provided between its bottom face and the floor 19 of the enclosure. When the above-mentioned cover (not shown) is placed over the enclosure 12 it will engage the upper surface of the bracket section 24, including the snap tab 24c and thus further secure the mounting bracket 20 to the power supply 22.

To remove the power supply 22 from the enclosure 12 for repair or replacement, the mounting bracket 20 can be released by pulling the lever 40 (FIG. 4) outwardly to the position shown by the phantom lines, so that the tabs 34a and 34b on the mounting bracket 20 clear the respective slots formed through the lever. The mounting bracket 20 with the power supply 22 mounted thereto, can then be pivoted outwardly to the position shown by the phantom lines in FIG. 1 in which it is outside the enclosure 12. The mounting bracket 20, and therefore the power supply 22, can then be disengaged from the enclosure 12 by removing the extrusion 38b from the the L-shaped slot 18c' in the flange 18c, and then removing the extrusion 38a from the opening 15b' in the flange 15b. The mounting bracket 20 can then be removed from the power supply 22 by disengaging the edge portions 24c' and 24c", the hooks 24a and 24b, and the tabs 32a and 36b of the mounting bracket from the power supply.

Thus, the mounting bracket enables the power supply 22 to be easily and quickly mounted in, and removed from, the enclosure 12 while allowing for placement of user accessibly or serviceable components below the power supply.

It is understood that the mounting assembly of the present invention is not limited to use with a desktop or laptop computer as described above by means of example, but is equally applicable for mounting any electrical component to other equipment.

It is also understood that the embodiment of the assembly of the present invention described above is intended to illustrate rather than limit the invention, and that the mounting assembly can take many other forms and embodiments within the scope of the invention.

What is claimed is:

1. A computer system comprising an enclosure: a microprocessor mounted in the enclosure; a memory module operably connected to the microprocessor; a power supply; a mounting bracket adapted to receive the power supply; at least one retaining member on the bracket engaging the power supply for retaining the power supply in the bracket; means for pivotally mounting the bracket to the enclosure for movement between a position in which the power supply is mounted in the enclosure and a position in which the power supply extends out of the enclosure, the enclosure having a floor and four walls extending perpendicular to the floor, the power supply being supported by the bracket above the floor in a mounted position; a portion of two walls of the enclosure being cut-away to receive the mounting bracket and the power supply; and the mounting bracket comprising two sections extending in a perpendicular relationship and, in the mounted position, the bracket and power supply respectively form a portion of the two walls of the enclosure.

2. The computer system of claim 1 further comprising a pair of extrusions formed on the bracket for engaging openings in the enclosure, for pivotally attaching the bracket to the enclosure.

3. The computer system of claim 1 further comprising a spring lever disposed on one wall of the enclosure for engaging a portion of the bracket.

4. The computer system of claim 1 wherein a pair of hooks extend from the bracket and engage corresponding slots in the power supply.

5. The computer system of claim 1 wherein there are a plurality of retaining members on the bracket which respectively engage the power supply, at least one of the retaining members being in the form of a snap tab disposed on a first section of the bracket and adapted to engage a face of the power supply.

6. The computer system of claim 5 wherein at least one other of the retaining members comprises a hook formed on the first section of the bracket for engaging a corresponding slot in the power supply.

7. The computer system of claim 5 wherein at least one other of the retaining members comprises a tab formed on the first section of the bracket for engaging a corresponding opening in the power supply, and a tab formed on a second section of the bracket for engaging a corresponding opening in the power supply.

8. The computer system of claim 1 wherein the mounting means comprises two spaced extrusions formed on the bracket and two spaced openings extending through the enclosure and adapted to receive the two extrusions, respectively.

9. An assembly for mounting a power supply; the assembly comprising an enclosure; a mounting bracket adapted to receive the power supply at least one retaining member on the bracket engaging the power supply for retaining the power supply on the bracket; means for pivotally mounting the bracket to the enclosure for movement between a position in which the power supply is mounted in the enclosure and a position in which the power supply extends out of the enclosure; the enclosure having a floor and four walls extending perpendicular to the floor; the power supply being supported by the bracket above the floor in a mounted position; a portion of two walls of the enclosure being cut-away to receive the mounting bracket and the power supply; and the mounting bracket comprising two sections extending in a perpendicular relationship and, in the mounted position, the bracket and the power supply respectively form a portion of the two walls of the enclosure.

10. The assembly of claim 9 further comprising a pair of extrusions formed on the bracket for engaging openings in the enclosure, for pivotally attaching the bracket to the enclosure.

11. The assembly of claim 9 further comprising a spring lever disposed on one wall of the enclosure for engaging a portion of the bracket.

12. The assembly of claim 9 wherein a pair of hooks extend from the bracket and engage corresponding slots in the power supply.

13. The assembly of claim 9 wherein there are a plurality of retaining members on the bracket which respectively engage the power supply, at least one of the retaining members being in the form of a snap tab disposed on a first section of the bracket and adapted to engage a face of the power supply.

14. The assembly of claim 13 wherein at least one other of the retaining members comprises a hook formed on the first section of the bracket for engaging a corresponding slot in the power supply.

15. The assembly of claim 13 wherein at least one other of the retaining members comprises a tab formed on the first section of the bracket for engaging a corresponding opening in the power supply, and a tab formed on a second section of the bracket for engaging a corresponding opening in the power supply.

16. The assembly of claim 9 wherein the mounting means comprises two spaced extrusions formed on the bracket and two spaced openings extending through the enclosure and adapted to receive the two extrusions, respectively.

17. A method of mounting a power supply in a multi-wall enclosure, the method comprising the steps of securing the power supply to a mounting bracket, cutting out a portion of two adjacent walls of the enclosure, and pivotally mounting the mounting bracket to the enclosure, whereby the mounting bracket and power supply form a portion of the two adjacent walls.

18. The method of claim 17 wherein the enclosure includes a floor and, in the mounted position, the mounting bracket and the power supply are pivotally supported solely by at least one wall of the enclosure in a raised position above the floor of the enclosure.

19. An assembly for mounting a power supply the assembly comprising an enclosure having four walls, a portion of at least one wall being cut-away, a mounting bracket for receiving the power supply, means connecting the mounting bracket to the enclosure in a manner so that the mounting bracket, in a mounted position, forms the cut-away portion of the one wall, two adjacent walls including the one wall having cut-away portions, the mounting bracket comprising two sections extending in a perpendicular relationship, and when the power supply is mounted in the bracket, the power supply and the bracket respectively form the cut-away portions of the two walls.

20. The assembly of claim 19 wherein the connecting means pivotally mounts the bracket to the enclosure for movement between a position in which the power supply is mounted in the enclosure and a position in which the power supply extends out of the enclosure.

21. The assembly of claim 19 wherein the enclosure has a floor, and wherein the power supply extends above the floor in its mounted position.

* * * * *